W. H. EAGAN.
ATTACHMENT FOR AGRICULTURAL FORKS.
APPLICATION FILED AUG. 28, 1914.
1,142,783.  Patented June 8, 1915.
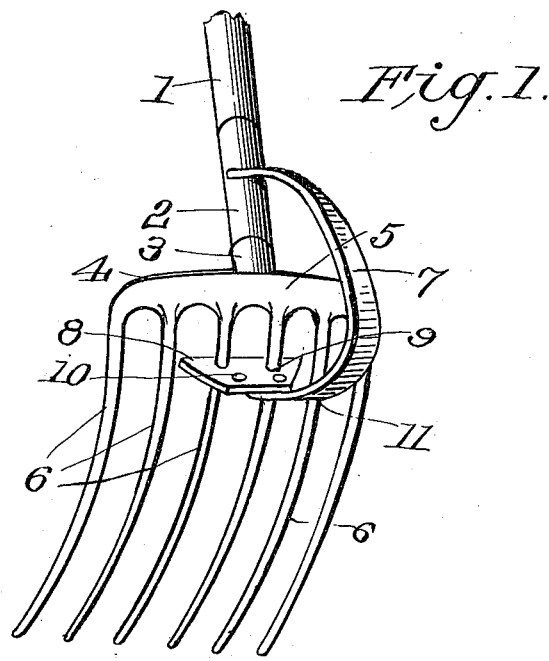
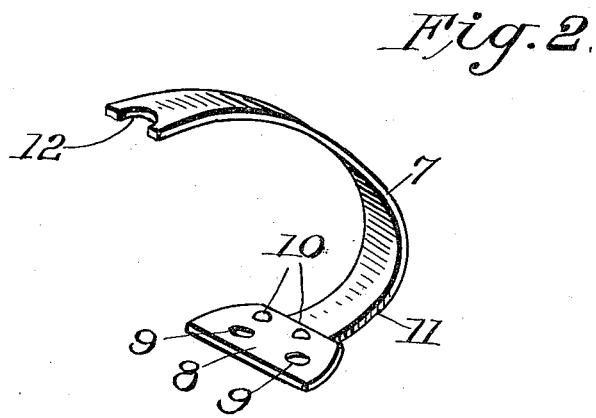
Inventor
W. H. Eagan

UNITED STATES PATENT OFFICE.

WILLIAM H. EAGAN, OF GRAND RAPIDS, MICHIGAN.

ATTACHMENT FOR AGRICULTURAL FORKS.

1,142,783.  Specification of Letters Patent.  Patented June 8, 1915.

Application filed August 28, 1914. Serial No. 859,075.

*To all whom it may concern:*

Be it known that I, WILLIAM H. EAGAN, a citizen of the United States, residing at Grand Rapids, in the county of Kent and State of Michigan, have invented certain new and useful Improvements in Attachments for Agricultural Forks; and I do hereby declare the following to be a full, clear, and exact description of the invention, such as will enable others skilled in the art to which it appertains to make and use the same.

This invention relates to new and useful improvements in attachments for agricultural forks, and has for its principal object to provide a device which may be easily and quickly attached to a fork without the use of screws or other fastening means.

Another object of the invention is to provide a device which may be easily and cheaply constructed of sheet metal and bent into form at a minimum expense.

A still further object of the invention is to provide a fulcrum which will form a bearing surface to easily and quickly loosen potatoes or similar vegetables which grow beneath the surface of the earth.

With these and other objects in view the invention consists in the combination and arrangement of parts which will be fully set forth in the following specifications and in the accompanying drawing, in which:

Figure 1 is a perspective view of a fork showing an attachment constructed in accordance with this invention as it would appear attached thereto, and Fig. 2 is a detail perspective view of the attachment.

Referring now to the drawings by characters of reference, the numeral 1 designates the handle of the fork which is provided at its lower terminal with the ferrule 2, this ferrule is arranged to extend into the sleeve 3 which is formed integral with the fork head designated generally by the numeral 4, this fork head comprises the transverse bar 5 having the tangs or prongs 6 formed thereon. These prongs are at spaced intervals as shown in the drawing and are arranged to enter the earth to lift up the vegetables which are to be removed.

The attachment which is best illustrated in Fig. 2 is designated generally by the numeral 7, and comprises the plate 8 which is provided near each end with the apertures 9 the use of which will appear as the description proceeds. Riveted or otherwise secured as at 10 to the rear edge of the plate is the fulcrum 11 which is formed of a single strip of metal which is bent in the shape of a U-shaped member as clearly shown. The end of this U-shaped member 11 opposite the one which is riveted to the plate 8 is provided with the semi-circular recess which is arranged to engage the ferrule 2 when the device is in use. This recess is designated by the numeral 12 and is designed to prevent the device from becoming disarranged.

From the foregoing, it will be apparent, that when it is desired to make use of this device the same is slipped in position so that the central prongs of the fork upon which it is used extends through the apertures 9 as clearly shown in Fig. 1. The device is then slipped upwardly toward the point where the tangs join the head and in this position it will be apparent that the ferrule 2 will be engaged by the walls of the recess 12, thereby preventing displacement of the attachment with relation to the fork. It will also be noticed that the upward pressure will be transmitted to the fork handle and thereby relieve the fork head of much of the strain. It will thus be seen that a particularly simple and effective fulcrum is provided, which may be easily and quickly attached to an agricultural fork, which will enable the user to more quickly loosen the earth surrounding the vegetable and permit the same to be easily removed.

While in the foregoing there has been shown and described the preferred embodiment of this invention, it is to be understood that such changes in the combination and arrangement of parts as may fall within the scope of the claims may be resorted to without departing from the spirit and scope of the invention.

Having thus described the invention, what is claimed as new, is:—

1. A fork attachment including a plate, a U-shaped fulcrum having one end secured to the plate, said plate being provided with a pair of spaced apertures, the apertures being arranged to receive the tangs of an agricultural fork and the opposite terminal of the U-shaped fulcrum being provided with a semi-circular recess to receive the handle of the fork.

2. The combination with an agricultural fork, of a fulcrum attachment, said fulcrum attachment comprising a plate, the plate being provided with a pair of spaced apertures receiving the tangs of the fork and a U-shaped fulcrum member secured to the plate, said fulcrum member having a semi-circular recess in the end opposite the plate, the walls of the recess being arranged to engage the handle of the fork and transmit the pressure from the fulcrum member to the fork handle.

In testimony whereof I affix my signature in presence of two witnesses.

WILLIAM H. EAGAN.

Witnesses:
FRANK T. CUDIHY,
JOHN BIRD.

Copies of this patent may be obtained for five cents each, by addressing the "Commissioner of Patents, Washington, D. C."